Sept. 23, 1969　　　　　T. E. KIRK　　　　　3,469,175
SEMICONDUCTOR VOLTAGE REGULATOR
Filed Aug. 6, 1962　　　　　　　　　　　2 Sheets-Sheet 1

INVENTOR.
THOMAS E. KIRK
BY C. R. Meland
ATTORNEY

Sept. 23, 1969            T. E. KIRK            3,469,175

SEMICONDUCTOR VOLTAGE REGULATOR

Filed Aug. 6, 1962

INVENTOR.
THOMAS E. KIRK
BY C. R. Meland
ATTORNEY

United States Patent Office 3,469,175
Patented Sept. 23, 1969

3,469,175
SEMICONDUCTOR VOLTAGE REGULATOR
Thomas E. Kirk, Anderson, Ind., assignor to General Motors Corporation, Detroit, Mich., a corporation of Delaware
Filed Aug. 6, 1962, Ser. No. 215,173
Int. Cl. H02h 7/06; H02p 9/30
U.S. Cl. 322—28                                    2 Claims

ABSTRACT OF THE DISCLOSURE

A circuit for regulating the direct current output potential of an electrical generating system. The field winding and a gate controlled switch are connected in series across the positive and negative polarity output circuit lines in that order. The gate electrode of the gate controlled switch is connected, through a capacitor, to the anode electrode of a silicon controlled rectifier included in the potential magnitude sensing circuit. With the silicon controlled rectifier in a non-conducting state, the gate controlled switch is triggered conductive by the positive polarity potential pulse applied across the gate-cathode electrodes as the capacitor charges. Upon the conduction of the silicon controlled rectifier with overpotential conditions, the charge upon the capacitor is applied in a reverse polarity relationship across the gate-cathode electrodes of the gate controlled switch to extinguish this device.

---

This invention relates to voltage regulators that employ semiconductor circuit elements and more particularly to voltage regultaors of the type that are useful in controlling the output voltage of a generator.

The subject invention is concerned with providing static voltage regulators for generators and more particularly is concerned with providing static voltage regulators which can be used to control the output voltage of a generator in motor vehicle electrical systems.

One of the objects of this invention is to provide a voltage regulating circuit for a generator or the like wherein a controlled rectifier is provided which is capable of being switched on and off by a signal applied to its gate electrode and which is connected to control the current flowing through a circuit element such as the field winding of the generator.

Another object of this invention is to provide a voltage regulating system which includes at least two controlled rectifiers at least one of which is capable of being switched on and off by a control signal applied to the gate electrode thereof.

Still another object of this invention is to provide a voltage regulator for generators and the like wherein a pair of controlled rectifiers are used and wherein one of the controlled rectifiers can be turned off by the discharging of a capacitor which discharges through the other controlled rectifier.

A further object of this invention is to provide a voltage regulator for generators and the like wherein a controlled rectifier controls current flow through a circuit element or field winding of the generator and wherein the controlled rectifier is turned off by the discharging of a capacitor through a voltage responsive discharging circuit.

A further object of this invention is to provide a semiconductor voltage regulator which has a voltage sensing circuit that includes a Zener diode and a tunnel diode.

Still another object of this invention is to provide a voltage regulating system for a generator or the like wherein the current flow through a circuit element such as the field winding of the generator is controlled by a controlled rectifier and wherein the conduction of the controlled rectifier is controlled by a voltage responsive circuit that includes a four-layer semiconductor PNPN diode.

Further objects and advantages of the present invention will be apparent from the following description, reference being had to the accompanying drawings wherein preferred embodiments of the present invention are clearly shown.

Figure 1:
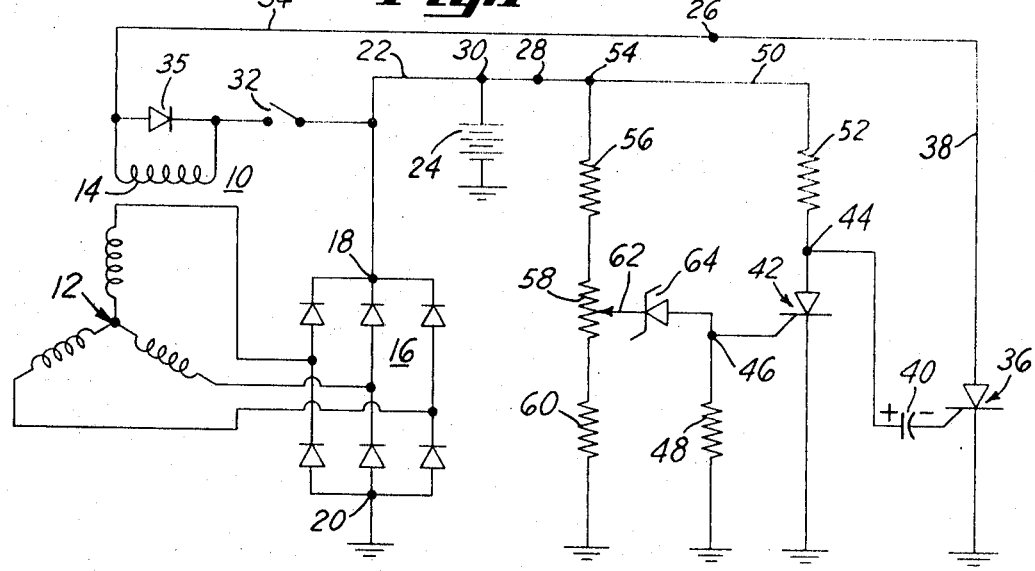
FIGURE 1 is a schematic circuit diagram of a voltage regulating system made in accordance with this invention.

Referring now to the drawings and particularly to FIGURE 1, the reference numeral 10 designates an alternating current generator having a three-phase Y-connected output winding 12 and a field winding 14. In motor vehicle installations, the field winding 14 may be rotatable and the output winding 12 may be the stator winding. It is immaterial, however, as to which winding rotates with respect to the other, it only being required that the output voltage of the generator be controlled by the energization of the field winding.

The output winding 12 is connected with a three-phase full wave bridge rectifier network 16 which is comprised of six PN junction semiconductor diodes. It can be seen that the phase windings of the output winding 12 are connected with the input terminals of the bridge rectifier 16. The bridge rectifier has DC output terminals 18 and 20. The DC output terminal 20 is grounded whereas the DC output terminal 18 is connected with alead wire 22 which feeds the loads on the motor vehicle including a battery 24.

It is, of course, appreciated that the bridge rectifier 16 has a direct current output which appears between the DC output terminals 18 and 20 and that this bridge rectifier converts the three-phase output of the output winding 12 to direct current. In this connection, it is noted that the voltage regulator of this invention can be used with a DC generator wherein a commutator converts the AC voltage to direct current.

The voltage regulator of FIGURE 1 has a field terminal 26 and a positive terminal 28 which is connected with lead wire 22 at the junction 30. The voltage regulator, of course, has another terminal which is grounded and this connection can sometimes be made by connecting the metal base of the regulator to a metal part of the motor vehicle.

One side of the field winding 14 of the generator 10 is connected to one side of a manually operable switch 32, the opposite side of this switch being connected with the lead wire 22 as shown. The opposite side of the field winding 14 is connected with the field terminal 26 of the voltage regulator via the lead wire 34. A silicon diode 35 is connected across the field winding 14 for suppressing transient voltages.

The field terminal 26 of the voltage regulator is connected with the anode of a controlled rectifier 36 via the lead wire 38. The controlled rectifier 36 is of a special recently developed type which is capable of being turned on or off by a control signal applied to the gate electrode thereof. Thus, the controlled rectifier 36 is of a type which will conduct between its anode and cathode whenever the gate electrode is positive with respect to the cathode. On the other hand, the controlled rectifier 36 can be turned off when the cathode has a higher potential or is positive with respect to the gate electrode and can be turned off even though the anode is at this time still positive with respect to the cathode. Because of this type of operation, this controlled rectifier can be termed a PNPN silicon gate controlled switch. This type of controlled rectifier differs from the older more conventional types in that with the older more conventional types, complete control for turning on and turning off the controlled rectifier could not be achieved by varying the gate signal. It is seen that the cathode of the controlled rectifier or gate controlled switch 36 is connected to ground whereas the gate electrode of this controlled rectifier is connected to one side of a capacitor 40.

The voltage regulator of FIGURE 1 has another controlled rectifier 42 which is of a type having a relatively high holding current. If a sufficient gate signal is applied to this controlled rectifier, it will conduct but it can be turned off if the gate signal is removed providing the current flowing between the anode and cathode is held below its holding current value. This controlled rectifier has an anode which is connected with junction 44 and a cathode which is grounded. The gate electrode of controlled rectifier 42 is connected with junction 46. It is seen that one side of the capacitor 40 is connected with junction 44. A resistor 48 is connected between junction 46 and ground.

The positive terminal 28 of the voltage regulator is connected with a lead wire 50. A resistor 52 is connected between lead wire 50 and the junction 44 and thus is in series with the anode-cathode circuit of the controlled rectifier 42.

A voltage divider is connected between junction 54 and ground and is comprised of resistors 56, 58 and 60. The resistor 58 is a variable resistor having a shiftable tap 62. A Zener diode 64 is connected between the shiftable tap 62 and the junction 46.

When the manually operable switch 32 is closed, the field winding 14 will be energized through a circuit that can be traced from one side of the battery 24, through lead wire 22, through switch 32, through field winding 14, through lead wire 34, through junction 26, through lead wire 38 and then through the anode-cathode circuit of controlled rectifier 36 to ground. The controlled rectifier 36 is turned on at this time by the charging of capacitor 40 through a circuit that included the resistor 52 and the gate-cathode circuit of controlled rectifier 36. As soon as the controlled rectifier 36 is turned on in its anode-cathode circuit, the potential of its gate electrode will approach that of ground potential and the capacitor 40 will be charged with a polarity as illustrated in FIGURE 1. The generator will now build up and at some point of time, there is sufficient output voltage from the bridge rectifier 16 to charge the battery 24 and this voltage may be approximately 14 volts in a 12 volt system. This voltage will be regulated by adjusting the variable resistor 58 to provide a desired regulated output voltage from the bridge rectifier 16.

In the event that the output voltage of bridge rectifier 16 exceeds the desired regulated value, the Zener diode 64 will break down and conduct in a reverse direction. When this happens, the voltage at junction 46 will be positive with respect to ground and a potential difference will therefore exist between the gate and cathode electrodes of the controlled rectifier 42. This will cause the controlled rectifier 42 to become conductive or to be turned on in its anode-cathode circuit. When this happens, the positive side of capacitor 40 is suddenly connected to ground and it discharges rapidly through the cathode-gate circuit of controlled rectifier 36. This will cause the controlled rectifier 36 to be immediately turned off in its anode-cathode circuit to therefore substantially open the circuit for the field winding 14 and reduce the output voltage of generator 10.

The current flowing in the anode-cathode circuit of controlled rectifier 42 is determined by the resistance of the resistor 52 and this current is maintained less than the holding current for the controlled rectifier 42. When the controlled rectifier 36 turns off, the output voltage of the generator-bridge rectifier combination will drop so that Zener diode 64 can return to its blocking condition and sufficient voltage is removed from junction 46 to cause controlled rectifier 42 to turn off in its anode-cathode circuit.

The above description has only set forth one cycle of operation; this is where the controlled rectifier is switched on and then off when the output voltage rises. This cycle is repeated during continuous operation of the system to provide an average current for the field winding 14 which is sufficient to maintain a desired constant output voltage from the bridge rectifier 16. The system therefore operates by a continuous switching of the controlled rectifier 36 to therefore maintain the output voltage of the generator-bridge rectifier combination substantially constant.

Figure 2:
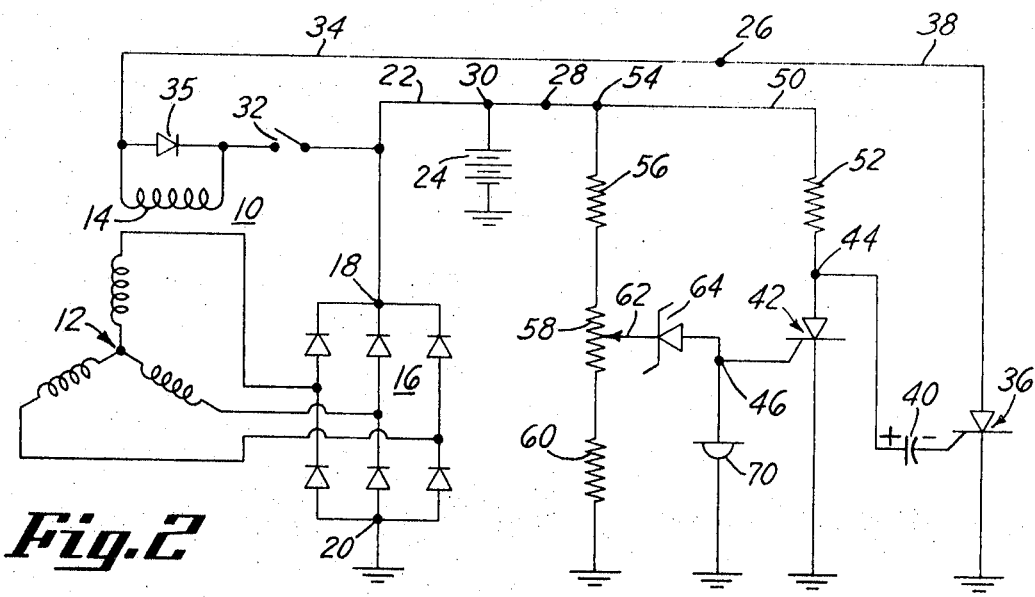
FIGURE 2 illustrates a voltage regulating system which is similar to that shown in FIGURE 1 but which employs a tunnel diode as part of the voltage sensing circuit.
Figure 3:
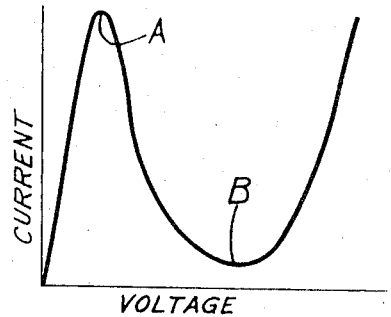
FIGURE 3 is a curve of voltage versus current for a typical tunnel diode of the type used in FIGURE 2.

Referring now more particularly to FIGURE 2, a modified voltage regulating system is illustrated which is similar to that shown in FIGURE 1. In FIGURES 1 and 2, the same reference numerals have been used to identify the identical parts of each figure. It can be seen that the FIGURE 2 system differs from that shown in FIGURE 1 in the voltage sensing part of the circuit. Thus in FIGURE 2, a tunnel diode 70 has replaced the resistor 48. This tunnel diode 70 has a voltage current characteristic which is depicted in the curve of FIGURE 3.

In the system of FIGURE 2, the controlled rectifier 36 is once more turned on by a voltage pulse which is coupled through resistor 52 and capacitor 40 to the gate-cathode circuit of controlled rectifier 36. The controlled rectifier 36 is thus turned on in the same manner as has been described above in connection with FIGURE 1 and the generator 10 therefore builds up until the desired regulated output voltage from the bridge rectifier 16 is attained.

When the output voltage exceeds the desired regulated value, the Zener diode 64 will break down in its reverse direction. The current passing through the Zener diode 64 will also pass through the tunnel diode 70 which now is operating in a range to provide a very low resistance. When the peak current designated by point A in FIGURE 3 is exceeded, the tunnel diode will switch from a high current-low resistance characteristic to a low current-high resistance characteristic. This transition is from between points A and B in FIGURE 3. As the tunnel diode switches from point A to point B, a positive voltage will be developed at junction 46 which causes the controlled rectifier 42 to turn on sharply in its anode-cathode circuit. With controlled rectifier 42 turned on in its anode-cathode circuit, the capacitor 40 will discharge through the controlled rectifier 42 to cause the cathode of controlled rectifier 36 to be driven positive with respect to its gate electrode. This causes the controlled rectifier 36 to be turned off in its anode-cathode circuit to therefore reduce the field current through field winding 14 to substantially zero and therefore causing a reduction in the output voltage of generator 10. As this output voltage drops, the Zener diode 64 returns to its blocking state and the tunnel diode 70 due to reduced voltage will suddenly return to its low resistance state depicted at point A in the curve of FIGURE 3. This will cause the gate signal to be removed from controlled rectifier 42 turning it off. The above-described cycle of operation goes on constantly at a rapid rate and the field current is therefore varied by turning on and turning off the controlled rectifier 36.

The system of FIGURE 2 provides a somewhat sharper switching action due to the provision of the tunnel diode 70 but otherwise operates like the system of FIGURE 1 in that field current is turned on and off by the switching of the controlled rectifier 36.

Figure 4:
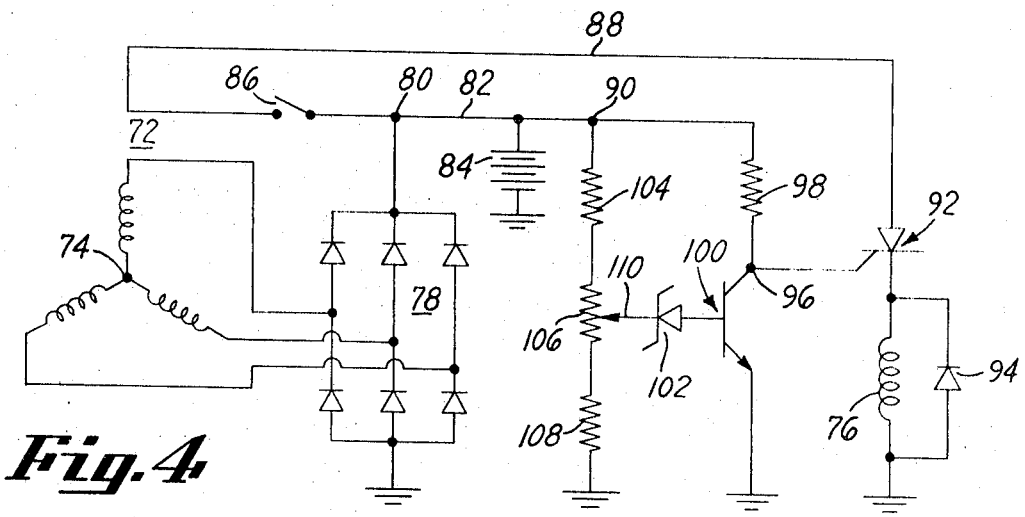
FIGURE 4 is a circuit diagram of a controlled rectifier voltage regulator wherein a Zener diode and transistor control the conduction of the controlled rectifier.

Referring now more particularly to FIGURE 4, the alternating current generator is designated by reference numeral 72 and includes a three-phase Y-connected output winding 74 and a field winding 76. It is seen that in the system of FIGURE 4, the three-phase output winding 74 is connected with the three-phase full wave bridge rectifier network 78 having one grounded DC output terminal and having the other DC output terminal connected with the junction 80. The junction 80 is connected with lead wire 82 which supplies charging current to the battery 84 and other DC loads of the motor vehicle. A manually operable switch 86 connects the junction 80 with lead wire 88. The lead wire 82 is connected with a junction 90 as is apparent from an inspection of FIG. 4. The lead wire 88 is connected with the anode of a controlled rectifier 92 which is of the same type as controlled rectifier 36 shown in FIGURE 1. The cathode of controlled rectifier 92 is connected to one side of the field winding 76 the opposite side of which is grounded. A transient voltage suppressing diode 94 is connected across the field winding 76.

The gate electrode of controlled rectifier 92 is connected with a junction 96. A resistor 98 connects the junctions 90 and 96. The junction 96 is connected with the collector electrode of an NPN transistor 100. The emitter electrode of transistor 100 is grounded as shown whereas the base electrode of transistor 100 is connected to one side of a Zener diode 102.

A voltage dividing network comprised of resistors 104, 106 and 108 is connected between junction 90 and ground. The resistor 106 is a variable resistor having a shiftable part or tap 110 connected to one side of the Zener diode 102.

When the switch 86 in FIGURE 4 is closed, the controlled rectifier 92 will be conductive in its anode-cathode circuit to provide an energization path for the field winding 76. The controlled rectifier 92 is initially conductive because the junction point 96 is at a positive potential with respect to the cathode of the controlled rectifier 92 due to its connection with lead wire 82 through the resistor 98.

When the generator 72 builds up to some voltage which is greater than the desired regulated value as determined by the setting of tap 110, the Zener diode 102 will break down in a reverse direction. This applies a biasing voltage to the base to emitter circuit of transistor 100 to cause it to turn on in its collector-emitter circuit. When transistor 100 turns on in its collector-emitter circuit, it connects the gate electrode of transistor 92 essentially to ground potential. This causes the controlled rectifier 92 to turn off in its anode-cathode circuit since instantaneously the gate potential at junction 96 is below the cathode potential of controlled rectifier 92. This causes an interruption in the field current with a consequent reduction in output voltage in the generator 72. When this output voltage drops below the desired regulated value, the Zener diode 102 reverts back to its normal blocking condition and the transistor 100 is turned off in its collector-emitter circuit. When transistor 100 turns off, the voltage on the gate electrode of controlled rectifier 92 swings positive to once more turn it on. This cycle of operation is repeated at a rapid rate to cause a turning on and turning off of controlled rectifier 92 which causes the current to be turned on and off for the field winding 76. An average current therefore flows through the field winding 76 which maintains the output voltage at a desired regulated value as determined by the setting of the variable tap on resistor 106. The resistor 98 determines the amount of gate current to turn the controlled rectifier 92 on.

Figure 5:
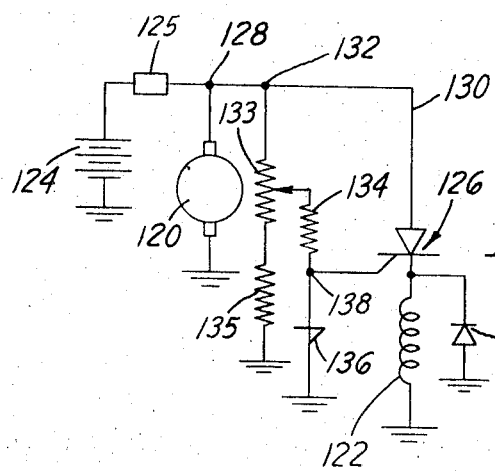
FIGURE 5 illustrates a voltage regulating system wherein a four-layer PNPN diode controls the conduction of the controlled rectifier.

Referring now more particularly to FIGURE 5, a voltage regulating system is illustrated for use with a DC generator or with a diode rectified AC generator. In FIGURE 5, the DC generator has an armature 120 and a field winding 122. The armature 120 supplies charging current to a battery 124 and other direct current loads on the motor vehicle through a conventional cut-out relay 125. The field current is controlled by a controlled rectifier 126 which is identical with the controlled rectifier 36 shown in FIGURE 1 and described hereinbefore.

The anode of controlled rectifier 126 is connected with junction 128 via the lead wire 130. The cathode of controlled rectifier 126 is connected to one side of the field winding 122, the opposite side of this field winding being grounded. A transient voltage suppressing diode 127 is connected across the field 122.

An adjustable voltage divider network is connected between junction 132 and ground and this network includes the potentiometer resistor 133 and a resistor 135. A resistor 134 and a four-layer PNPN semiconductor diode 136 are connected between the shiftable tap on resistor 133 and ground. The PNPN four-layer diode 136 breaks down when a predetermined voltage is applied across it. It is seen that the gate electrode of the controlled rectifier 126 is connected with junction 138 which is between the resistor 134 and the four-layer diode 136.

When the voltage appearing between junction 128 and ground is below the desired regulated value, the four-layer diode 136 will be nonconducting and will act as a very high resistance. The voltage at junction 138 and therefore the voltage of the gate electrode of the controlled rectifier 126 will essentially be the voltage of the tap on resistor 133 and the gate electrode will therefore be positive with respect to its cathode. The controlled rectifier 126 will therefore be conductive in its anode-cathode circuit and maximum current will be supplied to the field winding 122 to cause the output voltage of the generator 120 to increase.

When the output voltage appearing between junction 128 and ground reaches the desired regulated values which may be, for example, 14 volts in a 12 volt system, the four-layer diode 136 will break down and current will flow through the resistor 134 and through the four-layer diode to ground. The voltage of junction 138 will now approach ground potential so that the gate electrode of controlled rectifier 126 will be negative with respect to the cathode electrode thereof and the controlled rectifier 126 will therefore turn off in its anode-cathode circuit. A reverse current will also flow between the cathode and gate electrodes of controlled rectifier 126 to maintain it in its nonconductive state. This will cause the output voltage appearing between junction 128 and ground to drop to a point where the four-layer diode 136 resumes its blocking condition. When this occurs, junction 138 has a potential which again causes the controlled rectifier 126 to break down. It can be seen from the foregoing that the controlled rectifier 126 is constantly switched on and off at a rapid rate to provide an average field current for field winding 122 that will maintain a substantially constant output voltage between junction 128 and ground.

While the embodiments of the present invention as herein disclosed constitute preferred forms, it is to be understood that other forms might be adopted.

What is claimed is as follows:

1. In combination, a generator having an output winding and a field winding, a direct current output circuit having positive and negative polarity output circuit terminals energized from said output winding, a semiconductor switching device having an anode, a cathode and a gate electrode and being of the type which is capable of being switched conductive and nonconductive through the anode-cathode electrodes thereof by gate currents in the device between the gate electrode and the cathode electrode when the gate electrode is of a positive polarity with respect to the cathode electrode and between the anode electrode and the gate electrode when the gate electrode is of a negative polarity with respect to the cathode electrode, respectively, circuit means for connecting said field winding and the said anode-cathode electrodes of said semiconductor switching device in series across said positive and negative polarity output circuit terminals in that order, a controllable switching device having two current carrying electrodes and a control electrode, circuit means for connecting said current carrying electrodes of said controllable switching device across said positive and negative polarity output circuit terminals, a voltage divider network connected across said positive and negative polarity output circuit terminals, a Zener diode connected across a point along said voltage divider network and said control electrode of said controllable switching device and a capacitor connected across the said current carrying electrode of said controllable switching device which is connected to said positive polarity output circuit terminal and said gate electrode of said semiconductor switching device.

2. In combination, a generator having an output winding and a field winding, a direct current output circuit having positive and negative polarity output circuit terminals energized from said output winding, a semiconductor switching device having an anode, a cathode and a gate electrode and being of the type which is capable of being switched conductive and nonconductive through the anode-cathode electrodes thereof by gate currents in the device between the gate electrode and the cathode electrode when the gate electrode is of a positive polarity with respect to the cathode electrode and between the anode electrode and the gate electrode when the gate electrode is of a negative polarity with respect to the cathode electrode, respectively, circuit means for connecting said field winding and the said anode-cathode electrodes of said semiconductor switching device in series across said positive and negative polarity output circuit terminals in that order, a controlled rectifier having an anode, a cathode and a gate electrode, circuit means for connecting said anode-cathode electrodes of said controlled rectifier across said positive and negative polarity output circuit terminals, a voltage divider network connected across said positive and negative polarity output circuit terminals, a Zener diode connected across a point along said voltage divider network and said gate electrode of said controlled rectifier and a capacitor connected across said anode electrode of said controlled rectifier and said gate electrode of said semiconductor switching device.

References Cited
UNITED STATES PATENTS

| | | | |
|---|---|---|---|
| 3,137,811 | 6/1964 | Kirk | 322—28 X |
| 3,230,443 | 1/1966 | Hallidy | 322—28 |
| 3,242,346 | 3/1966 | Skoubo. | |

ORIS L. RADER, Primary Examiner

H. HUBERFELD, Assistant Examiner

U.S. Cl. X.R.

307—248, 284; 322—36, 73; 323—22